(12) United States Patent
Welle et al.

(10) Patent No.: US 11,516,029 B2
(45) Date of Patent: Nov. 29, 2022

(54) PROCESS MEASURING DEVICE HAVING A PLUG-IN MEMORY UNIT

(71) Applicant: VEGA GRIESHABER KG, Wolfach (DE)

(72) Inventors: Roland Welle, Hausach (DE); Karl Griessbaum, Muehlenbach (DE); Joerg Boersig, Schapbach (DE); Holger Staiger, Hardt (DE); Clemens Hengstler, Haslach (DE); Thomas Oehler, Biberach (DE); Manuel Harter, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 16/344,709

(22) PCT Filed: Oct. 12, 2017

(86) PCT No.: PCT/EP2017/076107
§ 371 (c)(1),
(2) Date: Apr. 24, 2019

(87) PCT Pub. No.: WO2018/077628
PCT Pub. Date: May 3, 2018

(65) Prior Publication Data
US 2020/0059374 A1    Feb. 20, 2020

(30) Foreign Application Priority Data
Oct. 27, 2016    (EP) .................................... 16196031

(51) Int. Cl.
*G06F 3/06* (2006.01)
*H04L 12/10* (2006.01)

(52) U.S. Cl.
CPC ............ *H04L 12/10* (2013.01); *G06F 3/0625* (2013.01)

(58) Field of Classification Search
CPC .................................... G06F 1/32; G06F 1/26
See application file for complete search history.

(56) References Cited

U.S. PATENT DOCUMENTS 4,788,488 A * 11/1988 Kramer ............. G01R 27/2605
324/601
8,942,239 B2    1/2015 Bessho et al.
(Continued)

FOREIGN PATENT DOCUMENTS

| AU | 2011205064 B2 | 3/2016 |
| CN | 103312617 A | 9/2013 |

(Continued)

OTHER PUBLICATIONS

Combined Chinese Office Action and Search Report dated Feb. 3, 2020 in Patent Application No. 201780066571.7 (with English translation of Categories of Cited Documents), 6 pages.

(Continued)

*Primary Examiner* — Paul Yen
(74) *Attorney, Agent, or Firm* — Oblon, McClelland, Maier & Neustadt, L.L.P.

(57) ABSTRACT

Described is a process measurement device having an interface for connecting a plug-in memory, in which a processing measurement device includes a memory operating device that can switch the process measurement device into a memory access mode when the memory is connected to the process measurement device. Also described is a power supply that ensures that the energy demand required for read access or write access to the process measurement device is automatically covered after the connection of the memory by increasing the amount of electrical energy that is freely available in the process measurement device. Undesired (Continued)

undersupply of the process measurement device can thereby be effectively avoided.

19 Claims, 4 Drawing Sheets

(56) References Cited

U.S. PATENT DOCUMENTS

| | | | | |
|---|---|---|---|---|
| 2004/0117675 | A1* | 6/2004 | Brockhaus | H02J 1/06 |
| | | | | 713/300 |
| 2010/0000879 | A1* | 1/2010 | Hladky | G01N 17/02 |
| | | | | 205/775.5 |
| 2011/0283119 | A1 | 11/2011 | Szu et al. | |
| 2012/0159208 | A1* | 6/2012 | Intrater | G06F 1/3268 |
| | | | | 713/320 |
| 2013/0173939 | A1 | 7/2013 | Peto | |
| 2013/0203463 | A1* | 8/2013 | Kent | H04W 52/0261 |
| | | | | 455/556.1 |
| 2013/0297840 | A1* | 11/2013 | Kagan | G06F 13/12 |
| | | | | 710/69 |
| 2014/0098842 | A1 | 4/2014 | White, III et al. | |
| 2014/0336988 | A1 | 11/2014 | Welle et al. | |
| 2015/0153393 | A1* | 6/2015 | Jeon | G06F 1/3203 |
| | | | | 702/60 |
| 2017/0293484 | A1* | 10/2017 | Haase | H04L 9/14 |

FOREIGN PATENT DOCUMENTS

| | | |
|---|---|---|
| DE | 10 2014 105 635 A1 | 10/2015 |
| DK | 2063362 T3 | 3/2014 |
| EP | 2 418 801 A1 | 2/2012 |
| EP | 2 063 362 B1 | 12/2013 |
| TW | 201537465 A | 10/2015 |

OTHER PUBLICATIONS

International Search Report dated Dec. 19, 2017 in PCT/EP2017/076107 filed Oct. 12, 2017.

European Search Report and Written Opinion dated Jan. 12, 2017 in European Patent Application No. 16196031.5-1862 filed Oct. 27, 2016 (with English language translation).

Office Action dated Oct. 18, 2021, issued in corresponding Taiwanese patent application No. 106137032 (with English translation).

* cited by examiner

PROCESS MEASURING DEVICE HAVING A PLUG-IN MEMORY UNIT

CROSS-REFERENCE TO RELATED APPLICATIONS

This application claims priority of the European patent application No. 16 196 031, filed on 27 Oct. 2016, which is hereby incorporated herein by reference.

FIELD OF THE INVENTION

The invention relates to process measurement technology. In particular, the invention relates to a process measurement device for connecting a plug-in memory unit, to a method for writing and reading a plug-in memory unit by a process measurement device, to a program element and a to computer-readable medium.

BACKGROUND

Process measurement devices measure a large number of relevant parameters in industrial processes, such as temperature, pressure, level, pH value, viscosity, flow. In order to reduce the installation and maintenance costs, two-wire systems are often used for the installation of such process measurement devices, in particular 4 . . . 20 mA two-wire loops, HART, Profibus PA or Foundation Fieldbus two-wire systems.

The connected process measurement devices are only supplied with limited power. For example, for 4-20 mA systems, the total power available for measurement within a process measurement device may be 50 mW or less. In addition, the transmission of information from a process control room to the sensor, which is also referred to below as a process measurement device, can be very slow, which causes no problems in a pure transmission of measured values.

However, modern process measurement devices are characterised by a high degree of digital circuit components. With the steadily increasing number of powerful and at the same time power-saving microprocessors in recent years, a large number of tasks for determining the actual measured values have been taken over by software programs. At the same time, the demand for new functions from the customers of such process measurement devices is steadily increasing. This can mean that already installed sensors have to be modified in their functionality by software updates.

In addition, there is often a desire on the part of the operators of process engineering systems for a systematic logging of unforeseen operating states of the process measurement device, in particular in the case of faults. For a reconstruction of the processes, which lead to a failure of the measurement device, the storage of extensive information may become necessary.

SUMMARY OF THE INVENTION

It is an object of the present invention to provide a process measurement device that allows fast writing and reading of data.

This object is achieved by the features of the independent claims. Further developments of the invention will become apparent from the dependent claims and the following description.

A first aspect of the invention relates to a process measurement device, such as a level gauge, which has an interface for connecting a plug-in memory unit to the process measurement device. The plug-in memory unit can in particular be a memory unit which stores large amounts of data and can be read and written at high speed and which is supplied with the energy required for its operation by the process measurement device.

To supply the energy required for this purpose, a memory operating device is provided in the process measurement device, which is designed for automatically transferring the process measurement device into a memory access mode when the plug-in memory unit is plugged into the interface and/or put into operation. In the memory access mode, the process measurement device is capable of supplying the plug-in memory unit with the electrical energy required for a read access and/or write access of the process measurement device to the memory unit. In addition, the process measurement device has a power supply unit which is designed to provide the electrical energy required for the read access and/or the write access of the process measurement device to the plug-in memory unit (or vice versa) by automatically increasing the electrical energy freely available in the process measurement device.

The freely available electrical energy in the process measurement device is the energy that is not already provided for other purposes, such as for performing a measurement, analysing measurement data or transmitting data, or for operating a peripheral device which is connected to and supplied with electrical energy by the process measurement device.

The freely available electrical energy in the process measurement device can, according to one embodiment, be increased by increasing the energy supplied to the measurement device.

According to one embodiment of the invention, the power supply unit is designed to provide the electrical energy required for the read access and/or the write access to the process measurement device or the plug-in memory unit by increasing the electrical energy transmitted from an external energy source (such as a 4-20 mA two-wire line) to the process measurement device. In the above example, it may be provided that the current in the two-wire line is increased to a maximum value, for example.

According to a further embodiment of the invention, the power supply unit is designed to provide the energy required for the read access and/or the write access to the process measurement device or the plug-in memory unit by reducing the electrical power required by the process measurement device.

Alternatively or additionally, for the provision of the electrical energy required for the read access and/or write access, the electrical power required by one or more peripheral devices connected to and supplied by the process measurement device is reduced.

It can be provided that the abovementioned measures take place stepwise, one after the other, until the energy demand required by the plug-in memory unit is covered or preferably even exceeded. It can also be provided that all or a selection of the measures mentioned occur simultaneously in order to be able to provide as quickly as possible a maximum available power for the operation of the memory unit.

According to one embodiment of the invention, the process measurement device is designed for obtaining its electrical energy exclusively from a 4 . . . 20 mA two-wire loop.

According to a further embodiment of the invention, the process measurement device is able to continuously monitor the electrical power required by the process measurement device and the peripheral devices optionally connected thereto, as well as the electrical power required by the plug-in memory unit. In this way, it can be prevented that the process measurement device falls into a power deficit, i.e. in other words that more power is required than is provided by the external power supply.

According to a further embodiment of the invention, the memory operating device is designed to recognise from the first data transmitted from the plug-in memory unit to the process measurement device whether a software update is to be imported, and in this case to increase the electrical energy transmitted from the external energy source to the process measurement device. In this way, it can be determined automatically and in a timely manner whether new software has to be loaded onto the process measurement device, so that sufficient energy can be provided as quickly as possible.

The process measurement device is, for example, a level gauge, a pressure gauge, a point level sensor or a flow meter.

According to one embodiment of the invention, the interface through which the plug-in memory unit can be connected to the process measurement device is a multi-purpose interface which can also be used by a peripheral device, for example a display and control device.

In this way, a compact process measurement device can be provided, the interfaces of which can be used flexibly.

According to a further embodiment of the invention, the interface is designed for receiving the plug-in memory unit in the process measurement device. The plug-in memory unit can thus be integrated, including the interface, within a pressure-tight, encapsulated sensor housing. It may be provided that the plug-in memory unit and the associated sensor interface are accessible from the outside after opening a cover of the sensor housing, and allow the user to change the medium in the absence of explosive gases or dusts.

Another aspect of the invention relates to a method for writing and/or reading a plug-in memory unit by a process measurement device. First, a plug-in memory unit is connected to an interface of the process measurement device by being plugged into the interface. The process measurement device may be able to independently detect the insertion or removal of a memory unit. In particular, it can be provided that the process measurement device automatically reads out a specifiable number of bytes from this medium when the plugging in of a memory unit is detected. It can be provided that the process measurement device independently initiates previously defined operating sequences on the basis of the bytes thus read, such as a software update or the saving of diagnostic data.

The process measurement device is then automatically transferred into a memory access mode, in which the process measurement device can supply the plug-in memory unit with the electrical energy required for a read access and/or write access of the process measurement device to the memory unit. The required electrical energy will depend on the type of memory unit and the operation to be performed. The electrical energy needed for read access and/or write access is provided by increasing the electrical energy freely available in the process measurement device. This process is triggered by the fact that the plug-in memory unit is connected to the interface of the process measurement device. The process measurement device may then independently determine whether to read data from the medium and/or to write data to the medium. A user may also determine, via a user interface, whether to read and/or write data.

A further aspect of the invention relates to a program element which, when executed by a memory operating device of a process measurement device, directs the process measurement device to perform the steps described above and in the following.

According to another aspect of the invention, a computer-readable medium is provided on which the program element described above is stored.

BRIEF DESCRIPTION OF EMBODIMENTS

In the following, embodiments of the invention will be described with reference to the drawings. The drawings are schematic and not to scale.

DETAILED DESCRIPTION OF EMBODIMENTS

Figure 1:
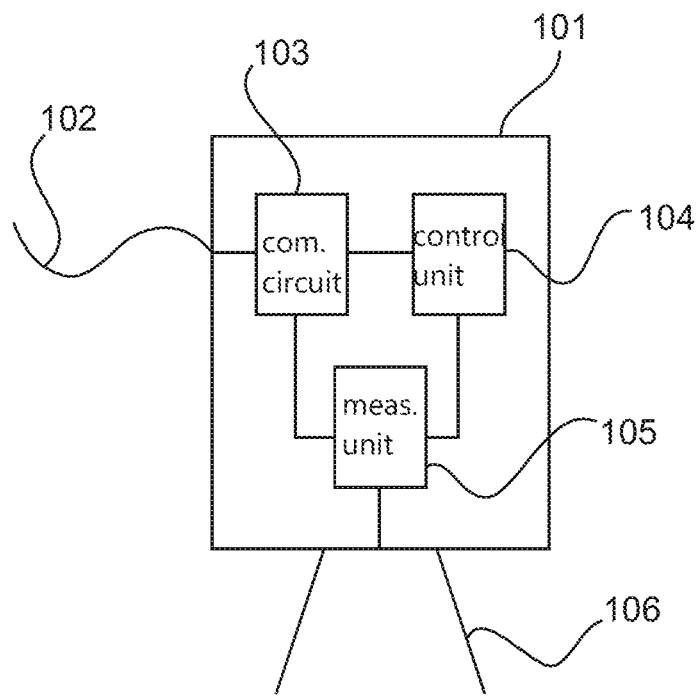
FIG. 1 shows a process measurement device.

FIG. 1 shows a typical structure of a process measurement device 101. The entire energy which is required for the operation of the measurement device is supplied to the measurement device via an interface 102, such as a 4-20 mA interface. On the one hand, a power supply and communication unit 103 integrated in the process measurement device 110 makes the measured values available to the outside by setting a loop current corresponding to the measured values. Furthermore, the power supply and communication unit 103 supplies the other components of the measurement device, i.e. in particular the evaluation and control unit 104 and the actual measuring unit 105, with energy. Additional electronic units may also be supplied with energy.

Figure 2:
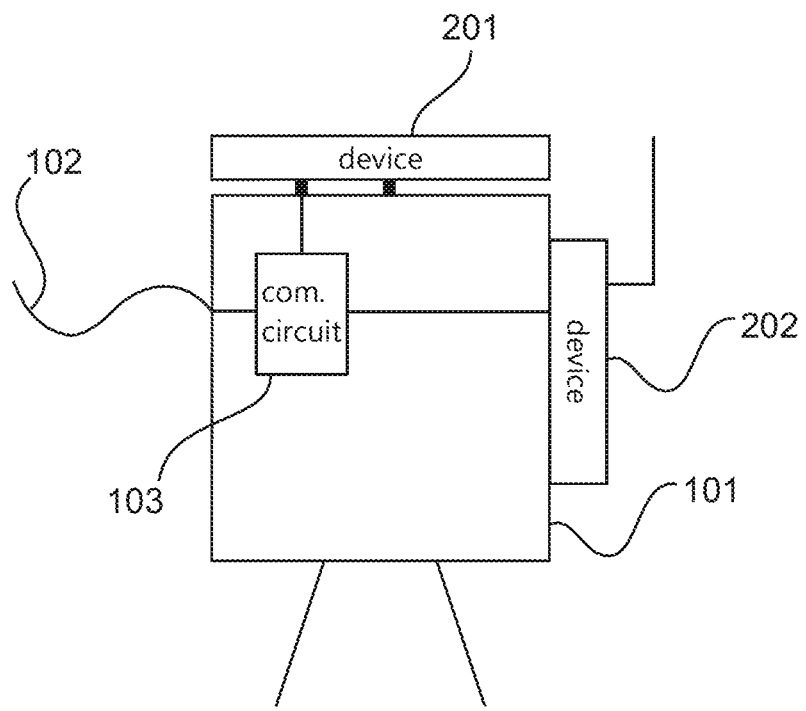
FIG. 2 shows a process measurement device with a peripheral device connected thereto.

FIG. 2 shows a corresponding process measurement device. By way of example, the measurement device 101, which has already been shown above, is here modularly expanded by additional components 201, 202. Depending on the requirements of the customer, additional peripheral devices 201, 202 may be mounted in or on the housing of the process measurement device 101.

For example, the process measurement device 101 can be provided with a display module 201 or with a Bluetooth module 202. Furthermore, further communication standards (WLAN, Modbus, 4-wire) or additional functions (communication modem for connection to PCs, service modules) may be provided by connecting via peripheral devices to or in the sensor. These peripheral devices generally receive the energy required for operation entirely from the process measurement device 101, in particular from the power supply unit 103.

Figure 3A:
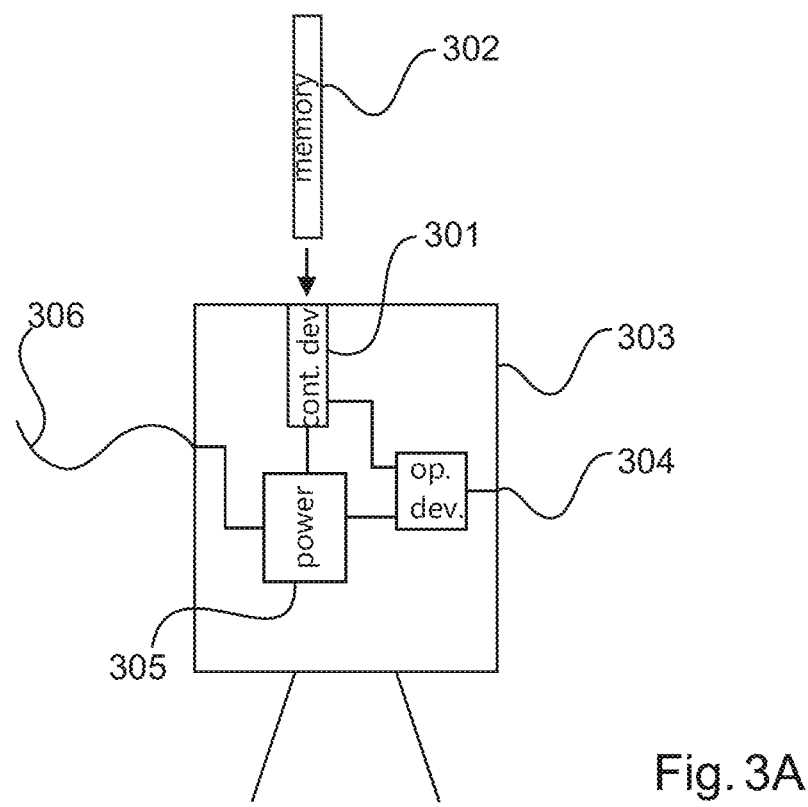
FIG. 3A shows a process measuring device according to an embodiment of the invention.

FIG. 3A shows a first embodiment of a process measurement device according to the invention. The process measurement device 303 has an interface integrated in the sensor electronics in the present embodiment, in the form of a contacting device 301, which is suitable for mechanically and electrically connecting a plug-in memory unit 302 to the process measurement device 303.

The plug-in memory unit 302 may be an SD card, a multimedia card, a USB stick, a micro SD card, or a CF card. Other units for storing data may also be used.

The memory unit 302 may in particular be used to transmit data to the process measurement device, for example as part of a software update. It may also be provided that the process measurement device writes data to the 302, such as status information, error messages or image data of the system memory in the event of malfunction of the process measurement device. Since the memory unit may be replaced easily and without additional tools in the field, a high customer benefit is achieved.

The plug-in memory unit 302 is supplied with writing and/or reading commands by a memory operating device 304 connected thereto. The energy required for reading and/or writing is provided at least in part by the process measurement device 303 itself and here in particular by the power supply unit 305.

It is possible that the electrical power required for writing and/or reading is so great that undisturbed operation of the process measurement device 303, which is a field device, can no longer be achieved. The power supply unit 305 is able to continuously monitor the power required by the active components in the process measurement device and the power required by the plug-in memory unit 302 and to compare them to the power currently provided via the two-wire interface 306. The latter is subject to great fluctuations in real sensors. Thus, a first measured value, for example, at a determined pressure of 0 bar, may cause a loop current of 4 mA. With a supply voltage of typically 15V, approximately 60 mW are available for the operation of the sensor (and any peripheral devices connected thereto). For example, a second measured value of 10 bar may result in a loop current of 20 mA, which corresponds to an available power of 300 mW.

Writing to an SD card typically requires 150 mW of electrical energy. It can thus be seen that, when an unfavourable value is measured, the power for operating the process measurement device and for writing to the plug-in memory unit may be insufficient.

Figure 3B:
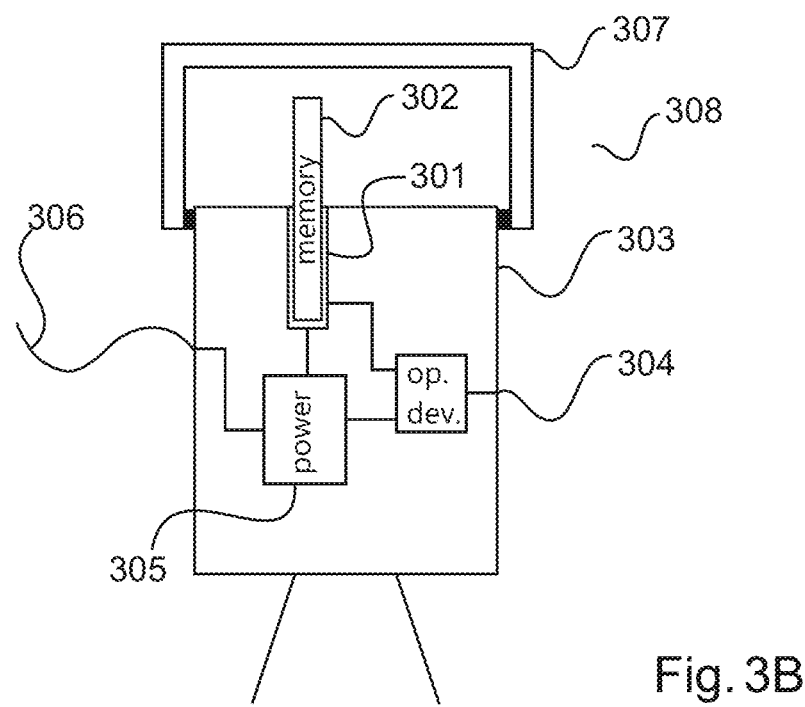
FIG. 3B shows a process measurement device according to a further embodiment of the invention.

In a particularly advantageous embodiment, the plug-in memory unit and the associated sensor interface may be accessible from the outside after opening a cover 307 of the sensor housing 303, allowing the user to replace the medium in the absence of explosive gases or dusts. FIG. 3B shows a corresponding arrangement with the cover 307 on, which hermetically seals the storage medium 302 and the interface 301 from a possible explosive atmosphere 308.

Figure 4:
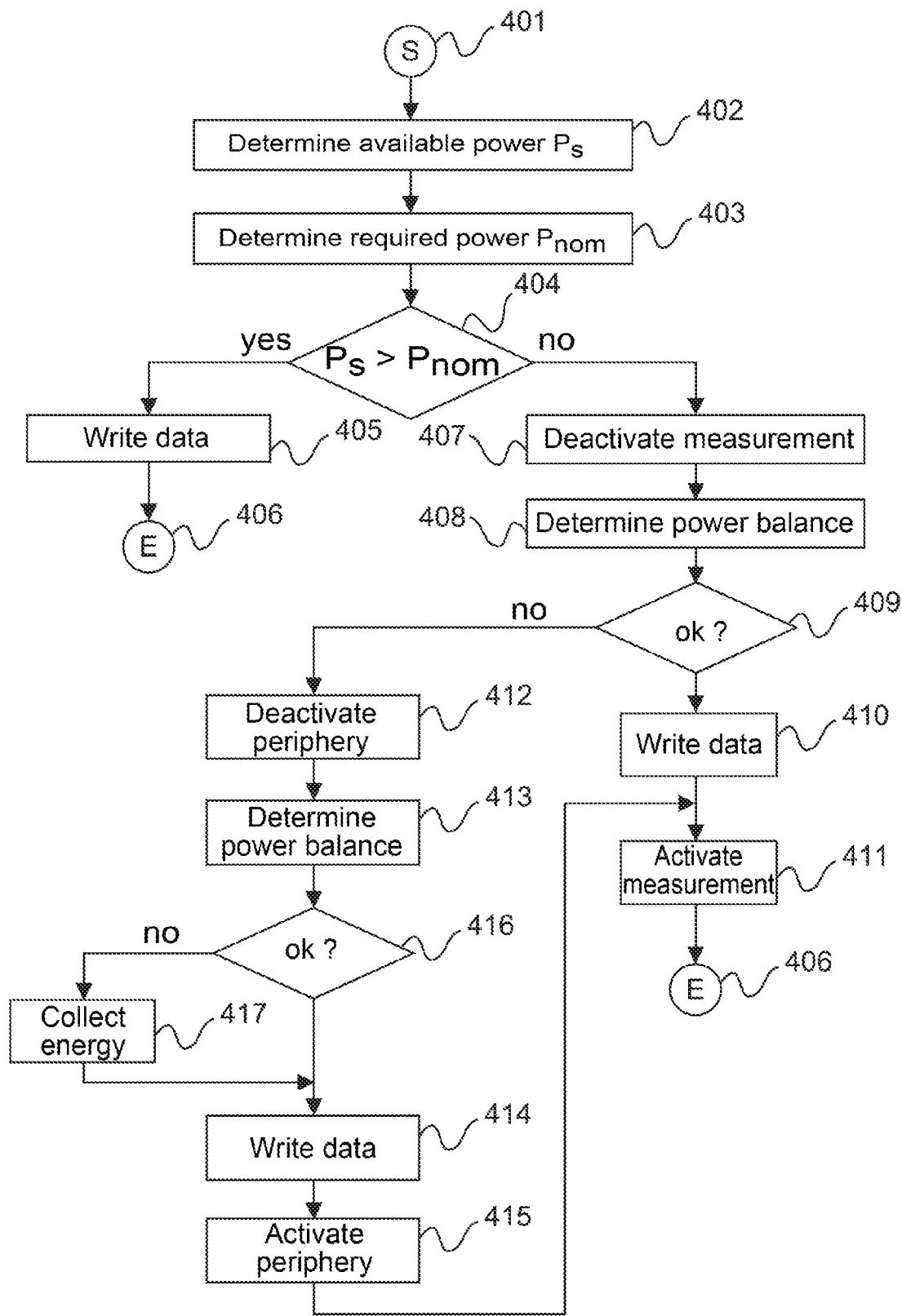
FIG. 4 is a flowchart of a method according to an embodiment of the invention.

FIG. 4 shows a process occurring within a power supply device 305 for eliminating the indicated problems. The method begins in the presence of a write request of the memory operating device 304 in the initial state 401. In step 402, the electrical power Ps supplied to the sensor via the interface 306 is first determined. In step 403, the power Pnom required by the sensor, the connected peripherals and the SD card in the write mode is then determined. If the available power Ps is large enough, the plug-in storage medium is written to in step 405. The method thus ends in state 406. Otherwise, an attempt is made to reduce the currently required power of the sensor. In step 407, the actual measurement is first deactivated for this purpose. By switching off the associated circuit parts, the required power is significantly reduced. In step 408, a determination is then made of the currently required power, which is composed, in this case, of the power of the peripheral devices and the power for writing on the medium. If the sum of the power required by the sensor and the memory unit in the write mode is smaller than the available power, then in step 410 the data is written to the medium. Subsequently, in step 411, the measurement is reactivated and the method ends in state 406. However, if the verification in step 409 shows that the power required for writing is still not available, then in step 412, one or more peripheral devices (such as a display module, Bluetooth module, etc.) are disabled. In step 413, it is then checked whether the available power is sufficient to write the data to the medium. If this is the case, then in step 414, the data is stored on the medium before the external peripheral devices and the actual measurement are reactivated. However, if the verification in step 416 reveals that the energy required for writing is still not available, then in step 417 an energy store integrated in the sensor is charged with electrical energy. If enough power has been accumulated therein for a write access, the data is written to the storage medium in step 414.

It should be noted at this point that it may be necessary, in particular for the last-mentioned process of energy accumulation, not to write large data sets in one piece on the storage medium, but in small subpackets of, for example, 32 bytes. The energy required for this purpose may be known in advance to the power supply unit 305, thus enabling it to determine in step 417 when sufficient energy has been collected. The actual formation of subpackets in one embodiment may be performed by the memory operating device 304. The memory operating device 304 and the power supply unit 305 may be connected via electrical lines, which may allow the exchange of control commands to implement the above-described procedure.

Figure 5:
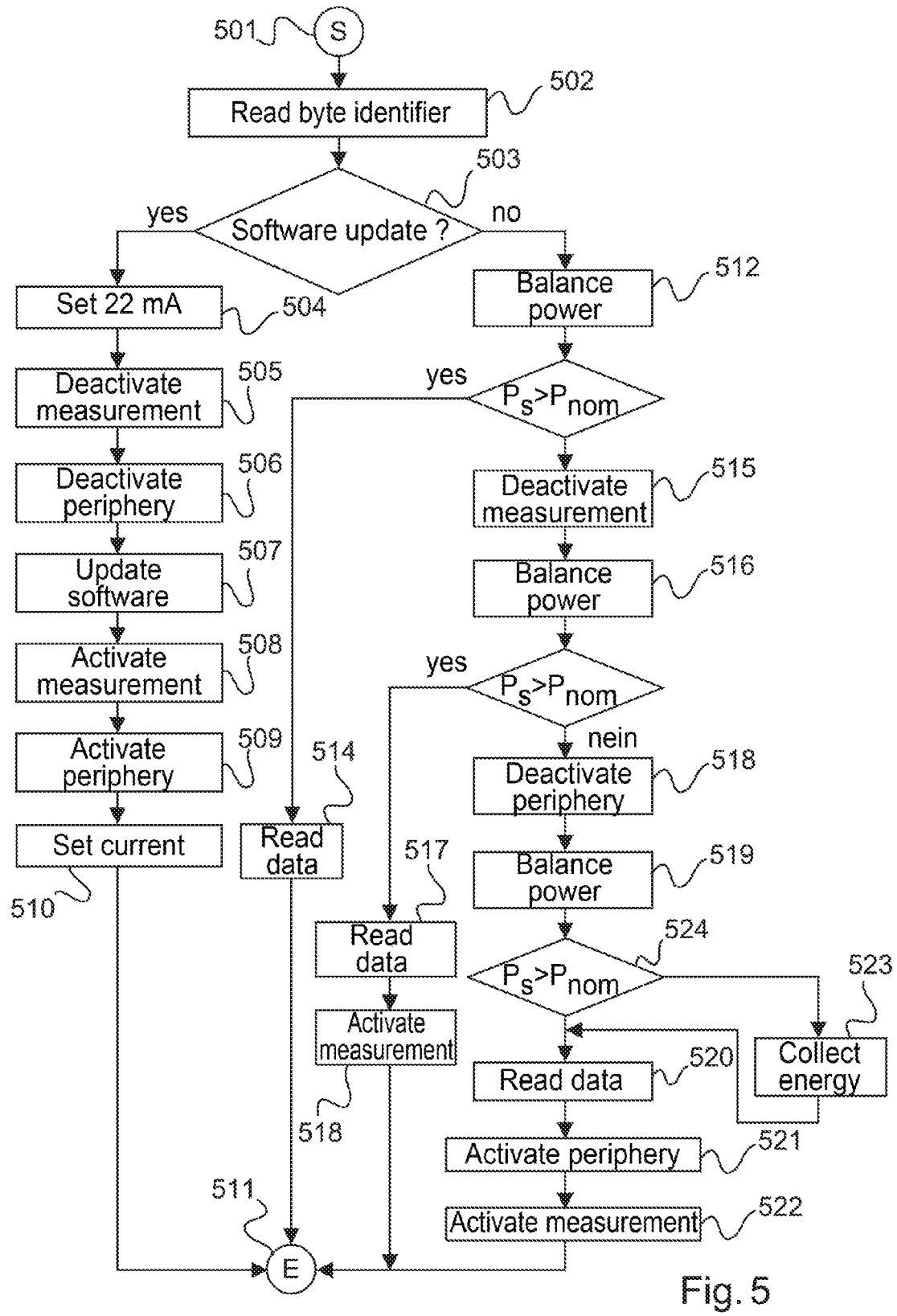
FIG. 5 is a flowchart of a method according to a further embodiment of the invention.

FIG. 5 shows a procedure for reading data from the plug-in memory module 302, which may be used particularly advantageously when importing new device firmware. The method begins in start state 501. First, the first bytes are read from the storage medium 302. Based on this a decision may be made in step 503, whether a software update is to be imported. If this is the case, then in step 504 the loop current 306 is first increased to a maximum value, such as 22 mA. The increased current consumption signals to the process control system, to which the process measurement device is connected, that the sensor has a fault. By this measure, the energy absorbed by the process measurement device is massively increased. As a supporting measure, the actual measurement is deactivated in step 504. Since no measured values are transmitted to the outside due to the onset of the fault current, the determination of further measured values can be dispensed with without any problem. Optionally, in step 506, the peripherals of the process measurement device 201, 202 may also be deactivated to further optimise the power balance and to support a very fast import of new firmware. In step 507, the new firmware is read from the plug-in storage medium and loaded into the sensor. Due to the high power available while minimising consumption, this step can be carried out very quickly. In step 508, the measurement is reactivated with the new firmware. In addition, in step 509, the external peripheral devices are again supplied with electrical energy. Finally, in step 510, the fault current of 22 mA previously provided to the interface 306 is replaced by a sensor current corresponding to the determined measured value. The update ends in state 511.

FIG. 5 also shows the process for reading general data, such as a new parameterisation for the sensor. Accordingly, a read request of the memory operating device 304 initially results in step 512 in the determination of the current power balance, which results from the currently supplied power, less the power required by the sensor and a read operation. If the available power is high enough, the data to be read is read in step 514 before the method ends in step 511. If the power for reading the data is insufficient, the measurement is first deactivated in step 515, before the power balance is determined again in step 516. If this balance is now positive, then the data to be read is read from the storage medium 302 in step 517, and the measurement is reactivated 518. If, however, the power is still insufficient, the connected peripheral is also deactivated in step 518, and a new determination of the power balance 519 initiated. If the power for reading the data is now sufficient, the data are read in 520. This is followed by the activation of the peripheral 521 and the actual measurement 522 before the final state 511 is reached. However, if the check in step 524 shows that the power is still insufficient, energy is collected in step 523 in an energy storage unit until a predetermined number of bytes may be read in. It is up to the memory operating device 304 to initiate a new read request if the number of bytes read in this way is insufficient. In this case, the process starts again from step 501.

It can be provided that the energy requirement of a plug-in storage medium within the device is known in advance. Such an approach would, for example, be successful if only approved makes of a plug-in memory unit were permitted to be used in conjunction with the process measurement device. It can also be provided that, when a storage medium is inserted, the process measurement device first automatically determines which power is required for reading and/or writing to/from the medium. Technically, this can be achieved by writing and reading of a few test bytes in conjunction with a measurement of the power absorbed by the plug-in storage medium.

It can be provided that data is written in compressed form on the plug-in medium. This allows a shorter duration of the actual write access, since fewer bytes have to be transmitted. Common compression algorithms may also be used, such as ZIP, RAR or others. In addition, when reading data, it may automatically be determined whether they must be uncompressed or not.

It is particularly advantageous to write the data on the plug-in storage medium in a conventional file format (such as FAT, NTFS, etc.). This gives the operator and/or the service staff the opportunity to read out the written content on any PC.

Data encryption may be provided when writing to the plug-in medium. In particular, in critical systems a misuse of the data in case of theft by unauthorised removal of the storage medium can be prevented.

A signing of the data may also be provided. In this way, only data from a known and trustworthy source can be read into the sensor, and thus, in particular, the introduction of malware is prevented. The latter could also be achieved by restricting the writing and/or reading function to data carriers specifically authorised by the manufacturer.

Moreover, a plurality of plug-in storage media may be connected to the process measurement device. As a result, increased reliability or a redundancy required by the safety standard may be achieved. In addition, the reliability can be increased when unintentionally removing the medium during a read or write access.

Moreover, the user may be informed by means of a signal tone or an indication that the plug-in storage medium can be removed without loss of data. This increases the safety when operating with plug-in storage media.

Furthermore, the plug-in data carrier including the contacting device may be integrated within a pressure-tight, encapsulated sensor housing. It can also be provided to equip the electrical contacts of the plug-in medium on the side of the process measurement device with special protection circuits. As a result, the process measurement device may be certified for use within a potentially explosive environment.

In particular, provision can be made to implement the electrical contacting of the plug-in memory module via a multi-purpose interface. In the absence of the plug-in medium, the interface may be used for connecting other peripheral devices, such as another display and control device. As a result, a compact design of the process measurement device is achieved.

In addition, it should be noted that "comprising" and "having" do not exclude other elements or steps, and the indefinite articles "a" or "an" do not exclude a plurality. It should also be appreciated that features or steps described with reference to any of the above embodiments may also be used in combination with other features or steps of other embodiments described above. Reference numerals provided in the claims are not to be considered as limitations.

The invention claimed is:

1. A process measurement device, comprising:
an interface configured to connect a plug-in memory to the process measurement device;
a memory operating device configured to transfer the process measurement device into a memory access mode, in which the process measurement device supplies the plug-in memory with electrical energy required for a read access or write access to the plug-in memory; and
a power supply configured to
determine an available power and a power required by a sensor of the process measurement device, peripherals connected to the process measurement device, and the plug-in memory in the write mode, and
if the available power is sufficient to provide the electrical energy required for the read access or the write access to the plug-in memory, provide the electrical energy required for the read access or the write access to the plug-in memory by increasing the electrical energy for the read access or the write access by increasing a supply of power transmitted, from a 4-20 mA two-wire loop, to the process measurement device,
wherein the increasing the electrical energy is performed in response to an instruction for the read access or the write access to the plug-in memory, and
wherein the power supply is configured to further provide the increase of electrical energy for the read access or the write access by decreasing electrical power used by the process measurement device.

2. The process measurement device according to claim 1, wherein the power supply is configured to provide the electrical energy required for the read access or the write access to the process measurement device by increasing the power supply transmitted from an external energy source to the process measurement device.

3. The process measurement device according to claim 1, wherein the power supply is configured to provide the electrical energy required for the read access or the write access to the process measurement device by reducing electrical power required by a peripheral device attached to and powered by the process measurement device.

4. The process measurement device according to claim 2, wherein the external energy source is exclusively the 4-20 mA two-wire loop.

5. The process measurement device according to claim 1, wherein power supply is further configured to continuously monitor electrical power required by the process measurement device and peripheral devices optionally connected thereto, as well as the electrical power required by the plug-in memory.

6. The process measurement device according to claim 1, wherein the memory operating device is further configured to recognise from first data transmitted from the plug-in memory to the process measurement device whether a software update is to be imported, and if so, to increase electrical power transmitted from an external energy source to the process measurement device.

7. The process measurement device according to claim 1, wherein the process measurement device is a level gauge, a pressure gauge or a flow meter.

8. The process measurement device according to claim 1, wherein the interface is a multi-purpose interface, to which a peripheral device is connectable.

9. The process measurement device according to claim 1, wherein the interface is further configured to receive the plug-in memory in the process measurement device.

10. The process measurement device according to claim 2, wherein the power supply is configured to provide the electrical energy required for the read access or the write access to the process measurement device by decreasing electrical power required by the process measurement device.

11. The process measurement device according to claim 2, wherein the power supply is configured to provide the electrical energy required for the read access or the write access to the process measurement device by reducing electrical power required by a peripheral device attached to and powered by the process measurement device.

12. The process measurement device according to claim 2, wherein power supply is further configured to continuously monitor electrical power required by the process measurement device and peripheral devices optionally connected thereto, as well as electrical power required by the plug-in memory.

13. The process measurement device according to claim 2, wherein the memory operating device is further configured to recognise from first data transmitted from the plug-in memory to the process measurement device whether a software update is to be imported, and if so, to increase electrical power transmitted from an external energy source to the process measurement device.

14. The process measurement device according to claim 2, wherein the process measurement device is a level gauge, a pressure gauge or a flow meter.

15. The process measurement device according to claim 2, wherein the interface is a multi-purpose interface, to which a peripheral device is connectable.

16. The process measurement device according to claim 2, wherein the interface is further configured to receive the plug-in memory in the process measurement device.

17. The process measurement device according to claim 1, wherein the power supply is further configured to provide the electrical energy required for read access or write access to the plug-in memory by increasing the electrical energy freely available in the process measurement device when it has been determined by the process measuring device that the energy freely available is smaller than the energy required by the process measurement device and the plug-in memory.

18. A method for writing and reading a plug-in memory by a process measurement device, the method comprising:
    connecting a plug-in memory to an interface of the process measurement device;
    determining an available power and a power required by a sensor of the process measurement device, peripherals connected to the process measurement device, and the plug-in memory in the write mode;
    if the available power is sufficient to provide the electrical energy required for a read access or a write access to the plug-in memory, transferring the process measurement device into a memory access mode, in which the process measurement device is capable of supplying the plug-in memory with electrical energy required for the read access or the write access to the plug-in memory; and
    providing the electrical energy required for the read access or the write access to the plug-in memory by increasing the electrical energy for the read access or the write access by increasing a supply of power transmitted, from a 4-20 mA two-wire loop, to the process measurement device,
    wherein the increasing the electrical energy is performed in response to an instruction for the read access or the write access to the plug-in memory, and
    wherein the power supply is configured to further provide the increase of electrical energy for the read access or the write access by decreasing electrical power used by the process measurement device.

19. A non-transitory computer readable medium having stored thereon a program that when executed by a processor causes the processor to implement a method for writing and reading a plug-in memory by a process measurement device, the method comprising:
    connecting a plug-in memory to an interface of the process measurement device;
    determining an available power and a power required by a sensor of the process measurement device, peripherals connected to the process measurement device, and the plug-in memory in the write mode;
    if the available power is sufficient to provide the electrical energy required for a read access or a write access to the plug-in memory, transferring the process measurement device into a memory access mode, in which the process measurement device is capable of supplying the plug-in memory with electrical energy required for the read access or the write access to the plug-in memory; and
    providing the electrical energy required for the read access or the write access to the plug-in memory by increasing the electrical energy for the read access or the write access by increasing a supply of power transmitted, from a 4-20 mA two-wire loop, to the process measurement device,
    wherein the increasing the electrical energy is performed in response to an instruction for the read access or the write access to the plug-in memory, and wherein the power supply is configured to further provide the increase of electrical energy for the read access or the write access by decreasing electrical power used by the process measurement device.

* * * * *